(12) United States Patent
Wilhelmi

(10) Patent No.: US 8,479,438 B1
(45) Date of Patent: Jul. 9, 2013

(54) ARTHROPOD ABATEMENT DEVICE

(76) Inventor: Vincent J. Wilhelmi, Kingston, IL (US)

( * ) Notice: Subject to any disclaimer, the term of this patent is extended or adjusted under 35 U.S.C. 154(b) by 364 days.

(21) Appl. No.: 12/806,021

(22) Filed: Aug. 4, 2010

(51) Int. Cl.
*A01M 1/02* (2006.01)

(52) U.S. Cl.
USPC .......................................... 43/121; 43/132.1

(58) Field of Classification Search
USPC ........................................ 43/107, 121, 132.1
See application file for complete search history.

(56) References Cited

U.S. PATENT DOCUMENTS

| | | | |
|---|---|---|---|
| 2,313,976 A * | 3/1943 | Sullivan et al. ................. | 43/129 |
| 3,159,190 A * | 12/1964 | Skiera et al. ................... | 141/369 |
| 4,907,366 A * | 3/1990 | Balfour ......................... | 43/132.1 |
| 5,099,598 A * | 3/1992 | Carter ........................... | 43/132.1 |
| 5,241,779 A * | 9/1993 | Lee ................................ | 43/139 |
| 5,471,782 A * | 12/1995 | Brittell .......................... | 43/121 |
| 5,647,164 A | 7/1997 | Yates | |
| 6,298,011 B1 | 10/2001 | Nyberg et al. | |
| 6,530,172 B2 | 3/2003 | Lenz | |
| 6,594,946 B2 * | 7/2003 | Nolen et al. ................... | 43/114 |
| 6,655,078 B2 | 12/2003 | Winner et al. | |
| 6,708,443 B2 | 3/2004 | Hall | |
| 6,920,716 B2 | 7/2005 | Kollars, Jr. et al. | |
| 6,990,768 B1 * | 1/2006 | Boston ......................... | 43/132.1 |
| D524,902 S | 7/2006 | Masters et al. | |
| 7,073,287 B2 | 7/2006 | Lau | |
| 7,117,632 B2 * | 10/2006 | Lin ................................ | 43/122 |
| 7,281,350 B2 | 10/2007 | Wilbanks | |
| 7,434,351 B2 | 10/2008 | Bette | |
| 7,448,160 B2 | 11/2008 | Roberts | |
| 2003/0080116 A1 * | 5/2003 | Williamson .................. | 219/719 |
| 2005/0108920 A1 | 5/2005 | Takenoshita et al. | |
| 2007/0074447 A1 | 4/2007 | Kalogroulis | |
| 2008/0184614 A1 | 8/2008 | Higbee et al. | |
| 2008/0254173 A1 * | 10/2008 | Woods ......................... | 426/231 |

* cited by examiner

*Primary Examiner* — David Parsley
*Assistant Examiner* — Danielle Clerkley
(74) *Attorney, Agent, or Firm* — Mathew R. P. Perrone, Jr.

(57) ABSTRACT

An abatement device that attracts and abates harmful arthropods, especially mosquitoes; which deposit their eggs in water; encourages the laying of eggs in a specific container of water where the object is to kill eggs, pupae or larvae of the arthropods by heating the water. Preferably, the water is supported in a flat horizontal round bottom water container. The water container may be supported on a lower base with three adjustable legs, which are attached to the underside of the lower base, which base supports the water container; and which, in turn, enables one to level the device if the grade is not level.

14 Claims, 19 Drawing Sheets

ARTHROPOD ABATEMENT DEVICE

This invention relates to an arthropod abatement device and more particularly to an arthropod abatement device, which attracts egg-laying arthropods to lay eggs in a desired area of water and kills the eggs, or the pupae or larvae derived therefrom with subsequently heated water, which treatment is especially effective against eggs, pupae or larvae of mosquitos.

BACKGROUND OF THE INVENTION

Some arthropods, such as insects and arachnids (also called arachnoids), can be very serious pests. It is desired to control these pests. To that end many pesticides are known. However, most of those pesticides have an adverse effect on the environment. Also, some of those serious pests can develop an immunity to the pesticide. Such immunity can lead to the use of a stronger pesticide, which is even more harmful to the environment.

Quite a number of arthropods, especially those harmful to the human race, lay eggs in standing bodies of water. The eggs then hatch and form pupae or larvae. The pupae or larvae can be harmful in and of themselves. Adults of these species can also be harmful in and of themselves too, as well producing additional eggs, which lead to the harmful pupae or larvae.

For example, among the arthropods, mosquitoes are at best a nuisance and at worst a deadly threat to mankind. As a nuisance, a mosquito bite will itch, which can be especially annoying to a human. Such itching, can become infected by scratching. Such infections can become serious. Before that happens, it is usually desirable to treat the area of the bites with an over-the-counter treatment, or even a prescription medicine.

Beyond the nuisance factor, mosquitoes are carriers, or vectors, for some of humanity's most deadly illnesses, and they are public enemy number one in the fight against global infectious disease. Mosquito-borne diseases cause millions of deaths worldwide every year with a disproportionate effect on children and the elderly in developing countries.

Worldwide, malaria is a leading cause of premature mortality, in children under the age of five, with around 5.3 million deaths annually, according to the Center for Disease Control. Mosquitoes can carry the following diseases: yellow fever, dengue fever, epidemic polyarthrithis, rift valley fever, Ross River fever, West Nile Virus, chikunguya, eastern equine encephalitis, Japanese encephalitis, lacrosse encephalitis, saint louis encephalitis, western equine encephalitis, and tularemia. In addition, parasitic roundworm is spread by mosquitoes to dogs, cats, wolves, sea lions and even humans. Mosquitoes can also carry the filariasis worm, a parasite that causes a disfiguring condition (often referred to as elephantiasis) characterized by a great swelling of several parts of the body; leaving, worldwide, around 40 million people living with a filariasis disability.

Mosquitoes transmit disease in a variety of ways. In the case of malaria, parasites attach themselves to the gut of a female mosquito and enter a host as she feeds. In other cases, such as yellow fever and dengue, a virus enters the mosquito as it feeds on an infected human and is transmitted via the mosquito's saliva to a subsequent victim.

There are more than 3,000 species of mosquitoes, but the members of three bear primary responsibility for the spread of human diseases. *Anopheles* mosquitoes are the only species known to carry malaria. They also transmit filariasis (also called elephantiasis) and encephalitis. *Culex* mosquitoes carry encephalitis, filariasis, and the West Nile virus. And *Aedes* mosquitoes, of which the voracious Asian tiger is a member, carry yellow fever, dengue, and encephalitis.

Mosquitoes use exhaled carbon dioxide, body odors, temperature, and movement to hone in on their victims. Only female mosquitoes have the mouth parts necessary for sucking blood. When biting with their proboscis, they stab two tubes into the skin: one to inject an enzyme that inhibits blood clotting; the other to suck blood into their bodies. They use the blood not for their own nourishment but as a source of protein for their eggs. For food, both males and females eat nectar and other plant sugars.

The mosquito undergoes complete metamorphosis, going through four distinct stages in its life cycle: Egg, larva, pupa, and adult. The length of the first three stages is dependent on the species and water temperature. *Culex tarsalis* may complete its life cycle in 14 days at 20° C. (68° F.) and only ten days at 25° C. (77° F.). Some species have a life cycle of as little as four days, whereas in other species some adult females can live through the winter, laying their eggs in the spring. Many species of mosquito live their adult stage in roughly two weeks to two months.

All mosquitoes need water to breed, so eradication and population control efforts usually involve removal or treatment of standing water sources. Insecticide spraying to kill adult mosquitoes is also widespread. However, global efforts to stop the spread of mosquitoes are having little effect, and many scientists think global warming will likely increase their number and range.

Global warming, the progressive and gradual warming of the earth's surface temperature, is the most worrisome effect of climate change. Today, scientists and professionals in the medical field are particularly concerned with how climate change will affect the mosquito population and how it will subsequently give potential rises to a variety of dangerous infectious diseases. It is predicted that global warming will increase the risk of infectious diseases, and most particularly those that are prevalent in warm areas of the world. The spreading of disease will be facilitated by mosquitoes and other insects as warmer temperatures will allow them to propagate in areas further north. What this means is that diseases like malaria, dengue fever, yellow fever and encephalitis, which are common in warm weather countries, will begin to invade countries that previously had no reason to be concerned with such health problems.

To that end, it is very desirable to control the mosquito population and certain other members of the arthropod family. If such control may be achieved with no more than minimal effect on the environment, great advantages are obtained. If a device can effectively achieve the desired results, especially of mosquito abatement, without environmentally harmful pesticides, even greater advantages are obtained.

SUMMARY OF THE INVENTION

Among the many objectives of the present invention is the provision of an arthropod abatement device to kill eggs, pupae or larvae with heated water.

Another objective of the present invention is the provision of an arthropod abatement device, which attracts arthropods.

Yet another objective of the present invention is the provision of an arthropod abatement device, which minimizes environmental damage.

Still another objective of the present invention is the provision of an arthropod abatement device, which allows at least one control feature to be added as desired.

Also, an objective of the present invention is the provision of a mosquito abatement device to kill mosquito eggs, pupae or larvae with heated water.

A further objective of the present invention is the provision of a mosquito abatement device, which attracts mosquitoes.

Yet a further objective of the present invention is the provision of a mosquito abatement device, which minimizes environmental damage.

Still a further objective of the present invention is the provision of a mosquito abatement device, which allows at least one control feature to be added as desired.

These and other objectives of the invention (which other objectives become clear by consideration of the specification, claims and drawings as a whole) are met by providing an abatement device that attracts and abates harmful arthropods, especially mosquitoes; which deposit their eggs in water; by heating the water to kill eggs, pupae or larvae of the arthropods. Preferably, the water is supported in as a thin water layer in a water container. The water container may be supported on a lower base with three adjustable legs, which are attached to the underside of the lower base, which base supports the water container; and which, in turn, enables one to level the device if the terrain or ground lacks a level grade.

BRIEF DESCRIPTION OF DRAWINGS

Throughout the figures of the drawings, where the same part appears in more than one figure of the drawings, the same number is applied thereto.

DESCRIPTION OF THE PREFERRED EMBODIMENTS

Figure 1:
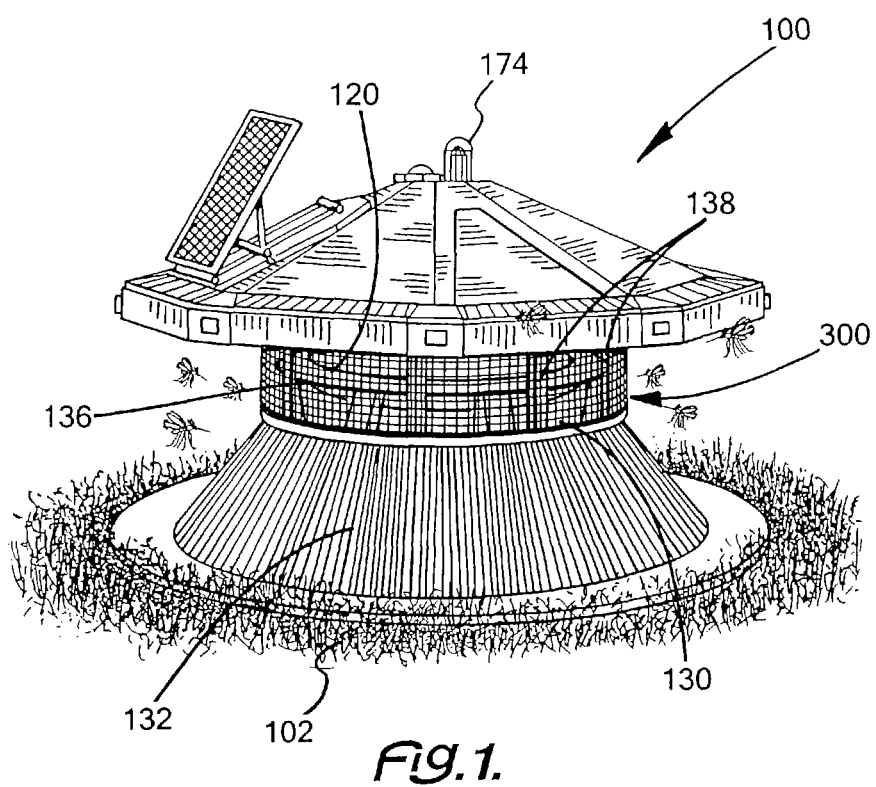
FIG. 1 depicts a side perspective view of the arthropod abatement device 100 of this invention in short grass 102.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, may be used with respect to the drawings. These and similar directional terms are not to be construed to limit the scope of the invention in any manner. The words attach, connect, couple, and similar terms with their inflectional morphemes do not necessarily denote direct or intermediate connections, but may also include connections through mediate elements or devices.

A device that attracts and kills arthropods, including insects and especially mosquitoes, has a housing, supporting a controlled amount of water. It is now known that hot water can kill eggs, pupae, or larvae. With a controlled heating device or heating element for the controlled amount of water, the controlled amount of water can be heated to a desired killing temperature for the undesirable eggs pupae or larvae.

Within the housing is supported a water container, which provides a thin layer of water. Preferably, the water container has flat round bottom, to provide a relatively thin water layer or a shallow depth of water in the container. There is a heating device, which warms or heats the water to the desired temperature; which is at least sufficient to kill eggs, pupae, or larvae of arthropods. Usually, the eggs, pupae or larvae cannot survive at a water temperature above forty five degrees Centigrade or about 113 degrees Fahrenheit. The temperature can vary depending on the geographical location. By having longitude and latitude programmed into the computer, an appropriate temperature for the water heater can be set. Such a temperature can also be set manually.

The water container can be emptied and refilled manually or automatically after a killing process. However, the same water can be used for many killing processes. Emptying of the water is required in the event of a device malfunction, so that water in the inoperable device, does not itself become a breeding ground. The arthropod abatement device can then be set for reuse.

If desired, extending from a lower base of the housing are three adjustable legs that both serve as a support and enable one to level the device, if the grade on which it is placed is not level. Each leg may have a wide surfaced foot that can be installed in the event that the ground is soft. Preferably, the primary use hereof is as mosquito abatement device.

On the base rests a bowl support to protect a canopy support as well as support the water bowl in a desired position. The water bowl includes a heating element to warm the water therein and destroy the eggs, pupae or larvae of the arthropod. The canopy is releasably secured to the canopy support, while the bowl is supported on the lower base with the bowl cradle and has the canopy support therearound.

Referring now to FIG. 1, arthropod abatement device 100, which attracts and kills arthropods, including insects and especially mosquitoes 112, is positioned on a level short grass field 102. Throughout the specification, unless otherwise specified, arthropod abatement device 100 or mosquito abatement device 100 are used interchangeably. Arthropod abatement device 100 has a housing 110, with a lower base 130 to contact the ground 108 in short grass field 102. A skirt member 132 rests on lower base 130. Slidably fitted within skirt member 132 and resting on lower base 130 is upper base 136. Resting on upper base 136 is a flat horizontal round bottom water container 120, supported thereon.

Around the edge of upper base 136, are canopy pillars 138, on which a cover or canopy 170 can be mounted to complete the housing 110. Canopy 170 can support a solar panel 180 to provide necessary power for the arthropod abatement device 100. In this water in the flat horizontal round bottom water container 120 is heated sufficiently to kill the arthropod larvae, pupae or eggs, especially those of the mosquito.

Figure 2:
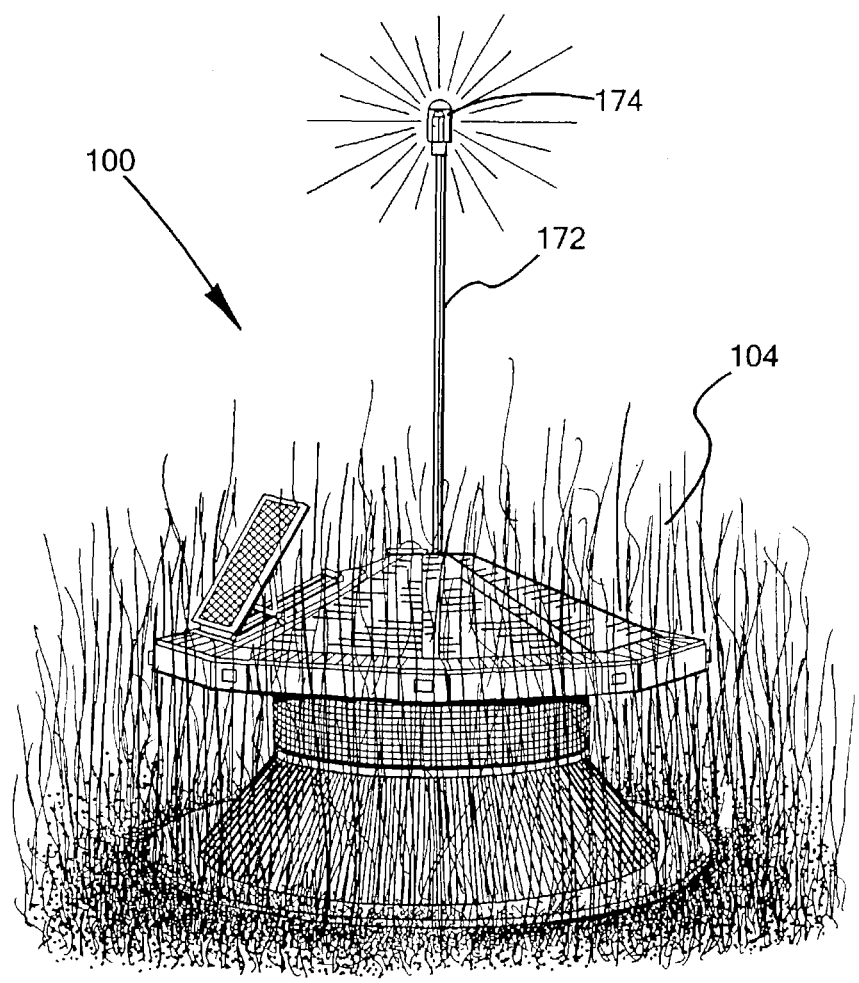
FIG. 2 depicts a side perspective view of the arthropod abatement device 100 of this invention in long grass 104.

Adding FIG. 2 to the consideration, arthropod abatement device 100 can also be used in long grass 104. Extension tower 172 is telescopically mounted in canopy 170 and may be extended above the long grass 104 as desired. With level indicator 174 and light assembly 176 mounted on the end of extension tower 172, arthropod abatement device 100 may be mounted level, which is important for the flat horizontal round bottom water container 120 to contain in the proper fashion to attract the arthropod, such as the mosquito, for the laying of the eggs, and eventual killing of the eggs, pupae or larvae when the water is heated.

Figure 3:
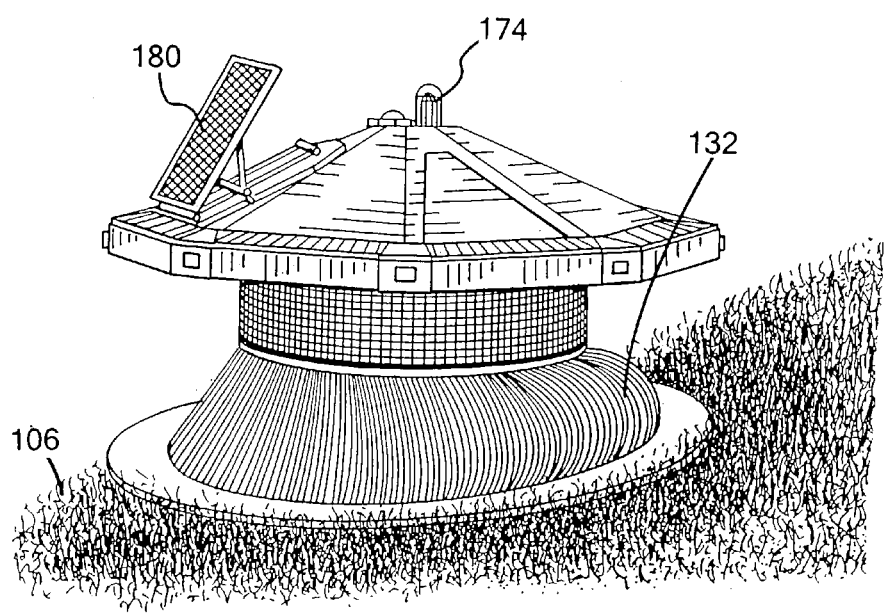
FIG. 3 depicts a side perspective view of the arthropod abatement device 100 of this invention on an uneven surface 106.

In FIG. 3, arthropod abatement device 100 is placed on an uneven surface 106. Even so, the flat horizontal round bottom water container 120 may remain horizontal due to appropriate adjustments. This permits the most efficient use of the water and attraction to arthropods, such as mosquitos, for elimination thereof.

Figure 4:
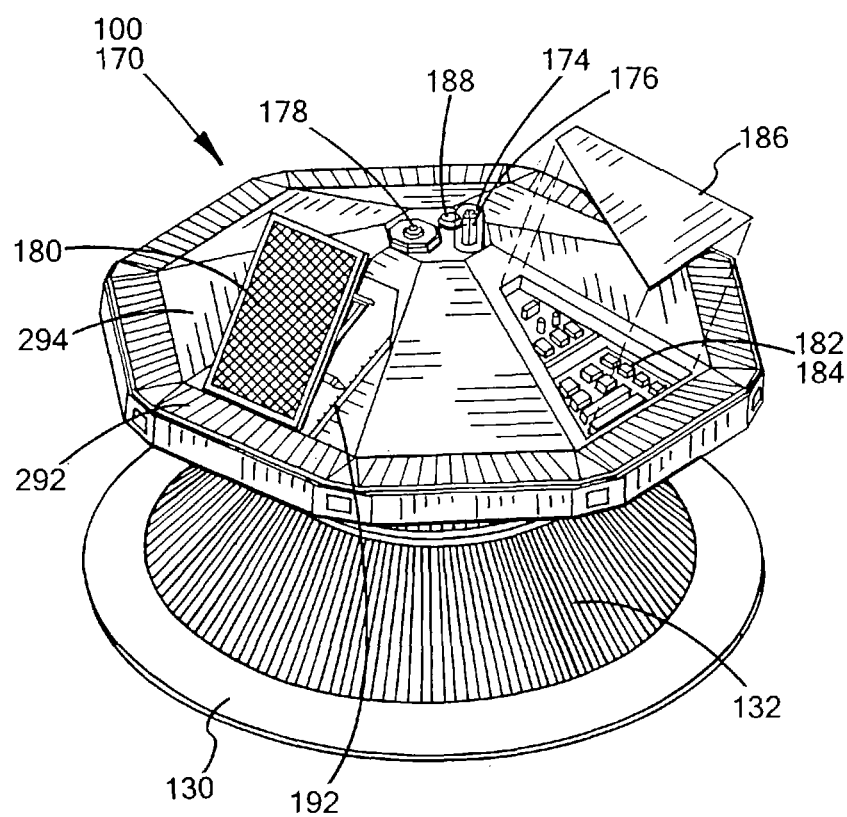
FIG. 4 depicts a top perspective view of the arthropod abatement device 100 of this invention.

With FIG. 4, canopy 170 for arthropod abatement device 100 is shown with its various controls. Extension tower 172 (FIG. 2) has mounted thereon the level indicator 174 and the light assembly 176, in about or adjacent to center of canopy 170. Also on canopy 170 is solar panel 180, which provides power to light assembly 176 and computer assembly 182. Computer controls 184 for computer assembly 182, which are mounted in canopy 170 and connected to solar panel 180 as a power source, are protected by access panel 186. Light assembly 176 may include a standard malfunction indicator to show when water flow or heating or other functions of the arthropod abatement device 100 perform improperly. Solar panel 180 can provide all required power for the abatement device 100, including the ability to recharge a standard battery assembly for the arthropod abatement device 100 connected to solar panel 180 in a standard fashion. The battery assembly may include one or more batteries of the disposable or rechargeable type.

Thus, light assembly 176 provides information as to the functioning of abatement device 100. Computer assembly 182 provides all necessary guidance to the abatement device 100. For example, the water level can be checked and controlled. The light assembly 176 can be activated as desired.

Figure 5:
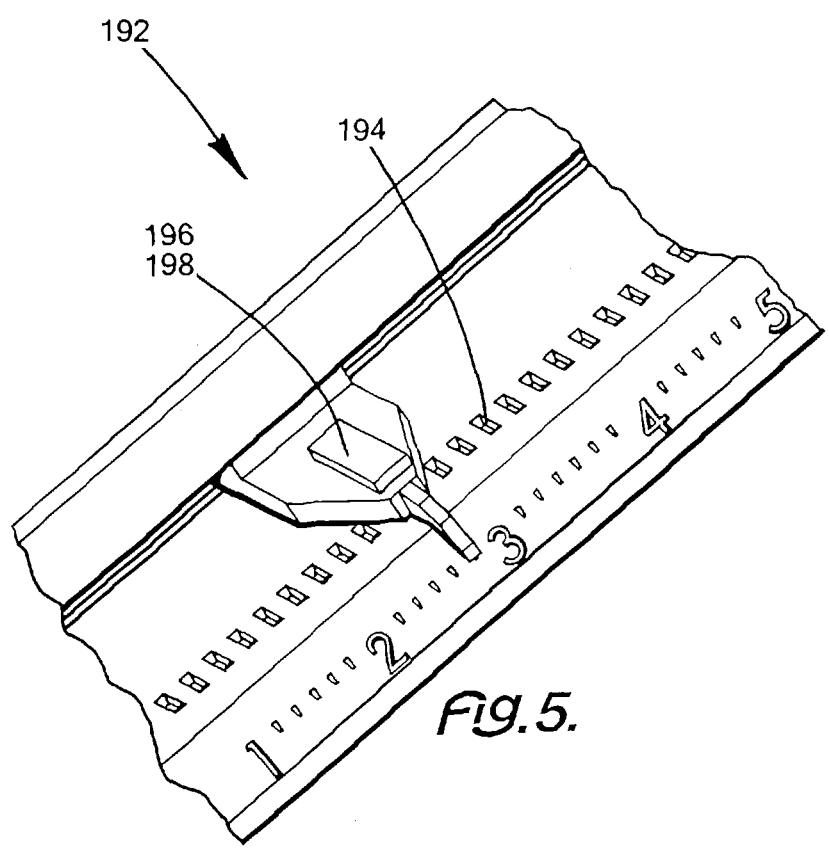
FIG. 5 depicts a perspective view of the pitch indicator 192 for the arthropod abatement device 100 of this invention.

Solar panel 180, as shown in FIG. 5, is mounted on a graduated pitch indicator 192. Various lock notches 194 cooperate with lock device 196 to position the solar panel 180 as desired. Lock release 198 permits adjustment of the pitch indicator 192 and hence the solar panel 180, for most efficient use thereof.

Figure 6:
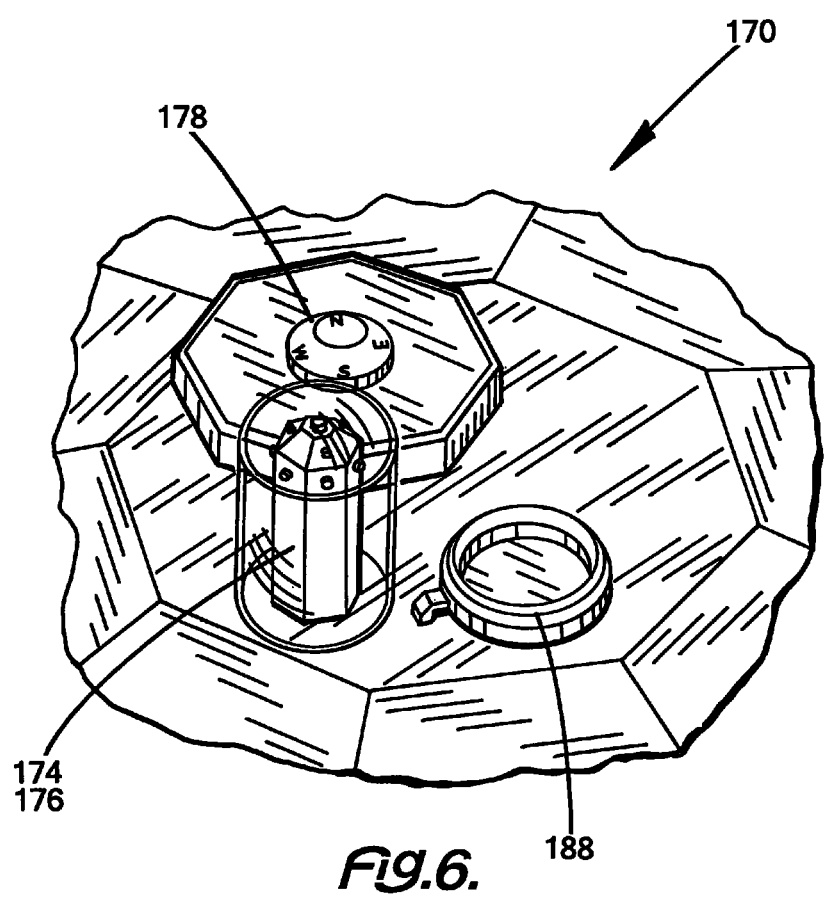
FIG. 6 depicts a top perspective view of the canopy 170 for the arthropod abatement device 100 of this invention.

In the center of canopy 170, depicted in FIG. 6, are a number of instruments which assist in the use of arthropod abatement device 100. The extension tower 172 has level indicator 174 and the light assembly 176 mounted therein. Compass 178 permits the solar panel 180 to be positioned as desired. Filler plug 188 permits access to flat horizontal round bottom water container 120.

Figure 7:
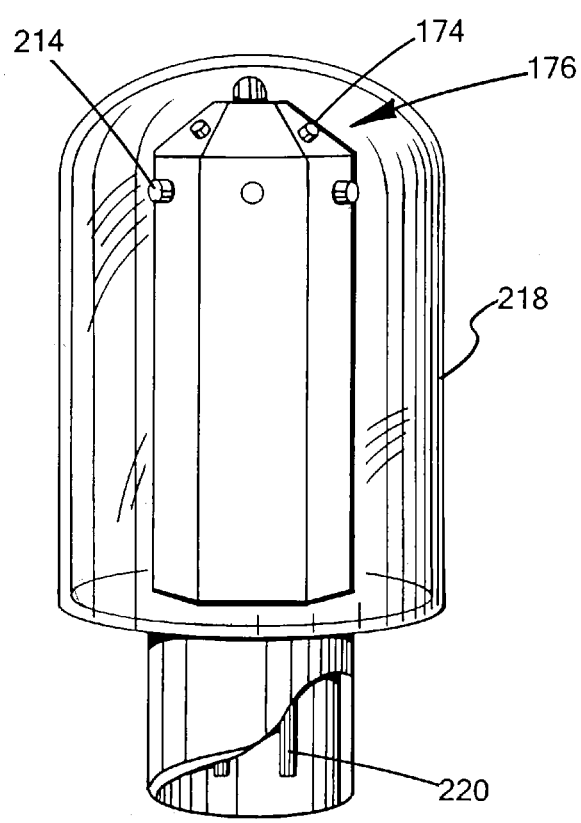
FIG. 7 depicts a perspective view of the light assembly 178 for the arthropod abatement device 100 of this invention.

The light assembly 176 is further explained in FIG. 7. Light housing 212 plugs into canopy 170 and supports level indicator 174. Also mounted in light housing 212 is system down light 214, which activates when the arthropod abatement device 100 malfunctions. Location lights 216 permit the arthropod abatement device 100 to be located efficiently. If desired, male plug assembly 220 can be used to connect light housing 212 to arthropod abatement device 100. Light housing cover 218 fits over the housing 212 and renders the light assembly 176 for arthropod abatement device 100 protected.

Figure 8:
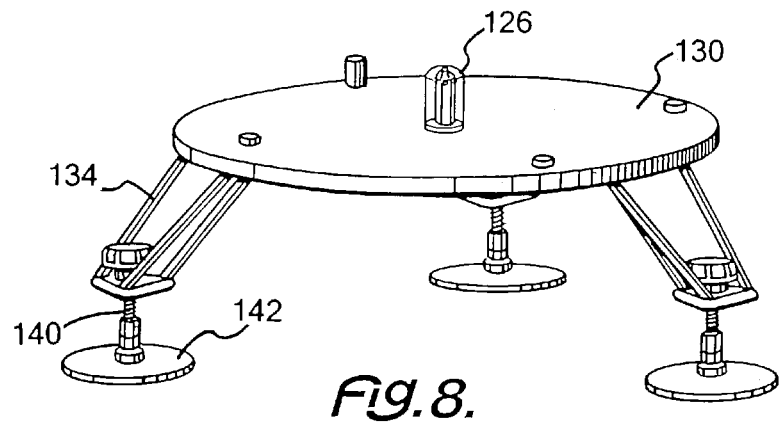
FIG. 8 depicts a perspective view of the foot pads 200 for the arthropod abatement device 100 of this invention.

In FIG. 8, for arthropod abatement device 100, extending from a lower platform of lower base 130 of the housing 110 are three adjustable legs 134, preferably the length thereof, that both serve as a support and enable one to level the device 100, if the grade on which it is placed is not level. If desired, lower base level 126 may be positioned lower base 130, to provide the leveling thereof prior to completing the assembly of arthropod abatement device 100. Each leg 134 has a level adjuster 140 so that flat horizontal round bottom water container 120 may be positioned as de horizontal to ground 108 for short crass field 102 (FIG. 1) or long grass field 104 (FIG. 2), or positioned desirably on uneven surface 106 (FIG. 3). Each level adjuster 140 may have a wide surfaced foot 142 that can be installed in the event that the ground 108 is soft. Preferably, the primary use hereof is as arthropod abatement device 100.

Figure 9:
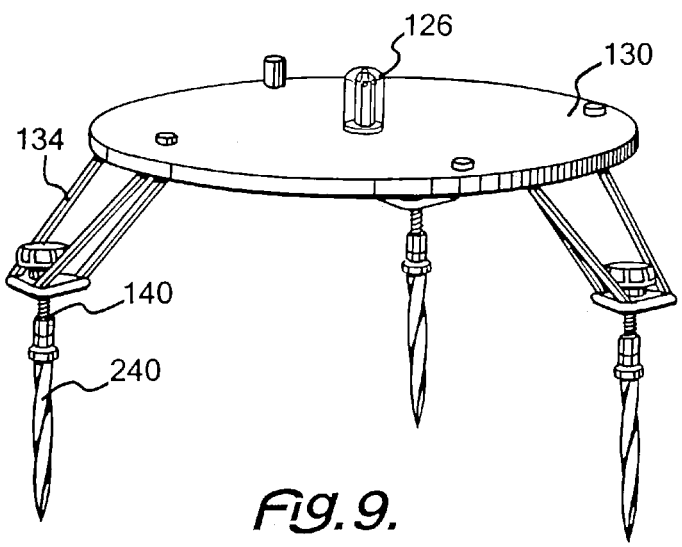
FIG. 9 depicts a perspective view of the anchors 240 for the arthropod abatement device 100 of this invention.

With the addition of anchor 240 in FIG. 9 to each of legs 134, it is possible to secure arthropod abatement device 100 to desired position by more than just the weight of the abatement device 100. After anchor 240 is put in the ground 108 for short grass field 102 (FIG. 1), long grass field 104 (FIG. 2) or uneven surface 106 (FIG. 3), level adjuster 140 can make lower base 130 level. Level indicator 174 is placed on lower base 130, so level adjuster 140 can indicate when lower base 130 is level to properly position arthropod abatement device 100.

Figure 10:
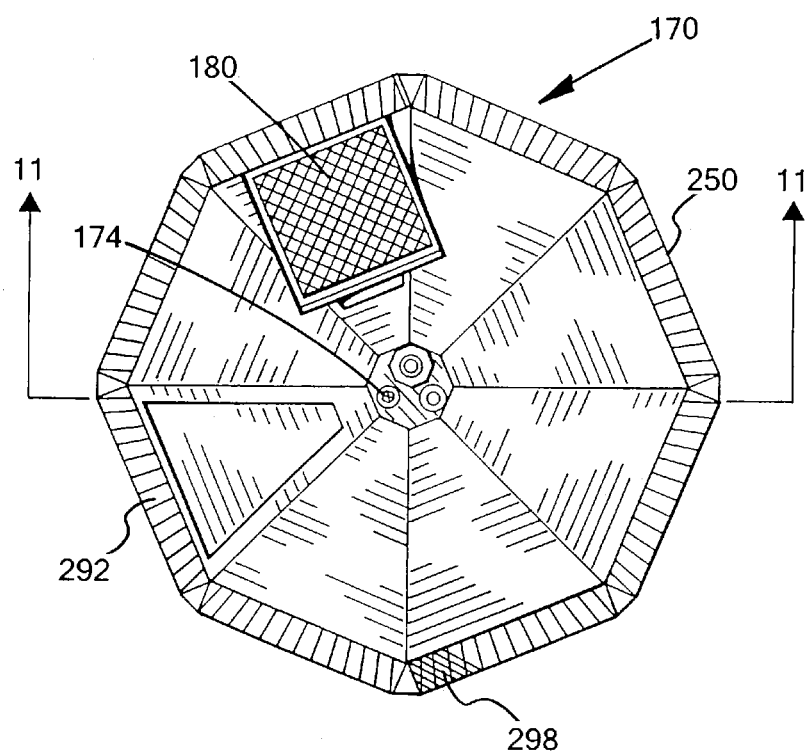
FIG. 10 depicts a top plan of the arthropod abatement device 100 of this invention.

With the canopy 170 as shown in FIG. 10, the position of the level indicator 174, filler plug 188 and compass 178 in the center thereof are shown. Compass 178 aids the proper positioning of solar panel 180. Around the edge 250 of canopy 170 is a gutter 252 to catch rain water. A screen 254 may be placed over the gutter 292, so that only water can be admitted thereto.

Figure 11:
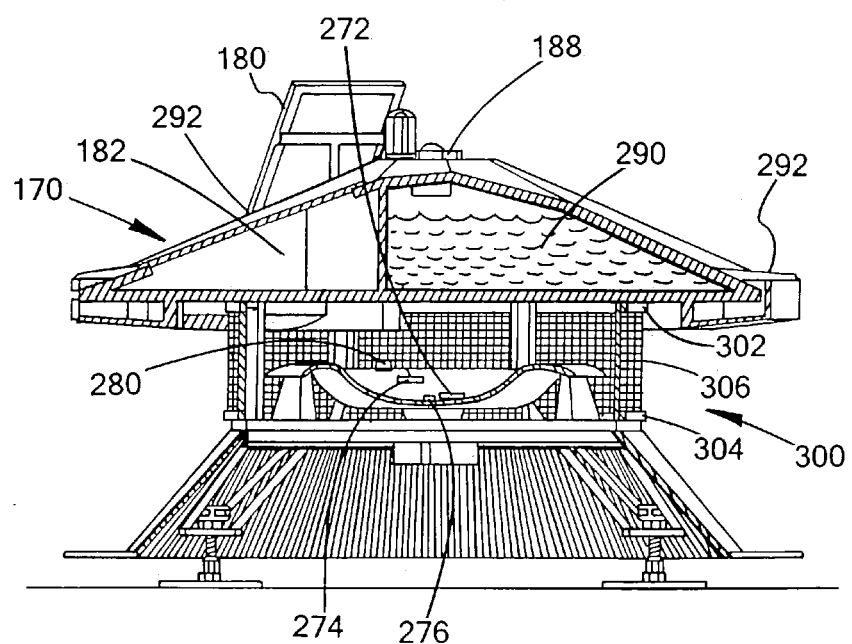
FIG. 11 depicts a cross-sectioned view of the arthropod abatement device 100 of this invention along Line 11-11 of FIG. 10.
Figure 12:
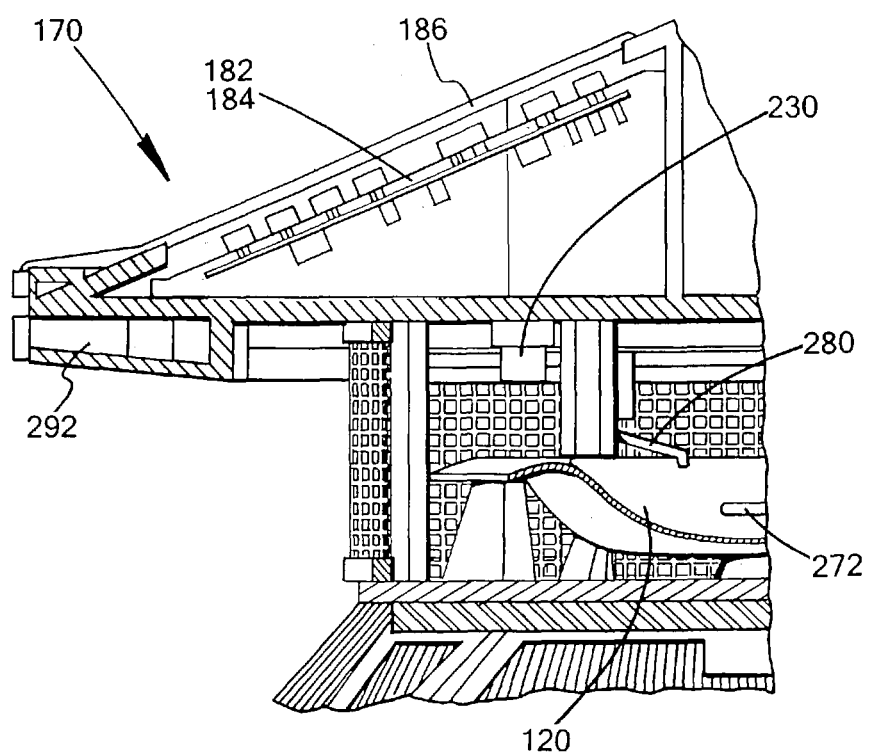
FIG. 12 depicts a partially cross-sectioned view of the water level sensor 230 for the arthropod abatement device 100 of this invention.

As shown in FIG. 11, a water storage tank 290 is mounted in canopy 170. Gutter 292 feeds rain water to storage tank 290. The gutter 292 is the primary water reservoir, from which the flat horizontal round bottom water container 120 may be filled. This enables the gutter to be refilled during each rain, any excess water will over flow onto the ground. The secondary reservoir will be used in the event that the gutter reservoir is does not contain enough water. This provides a reservoir for water to be used in the container 120 as desired. Tank 290 communicates with filler plug 188.

Figure 13:
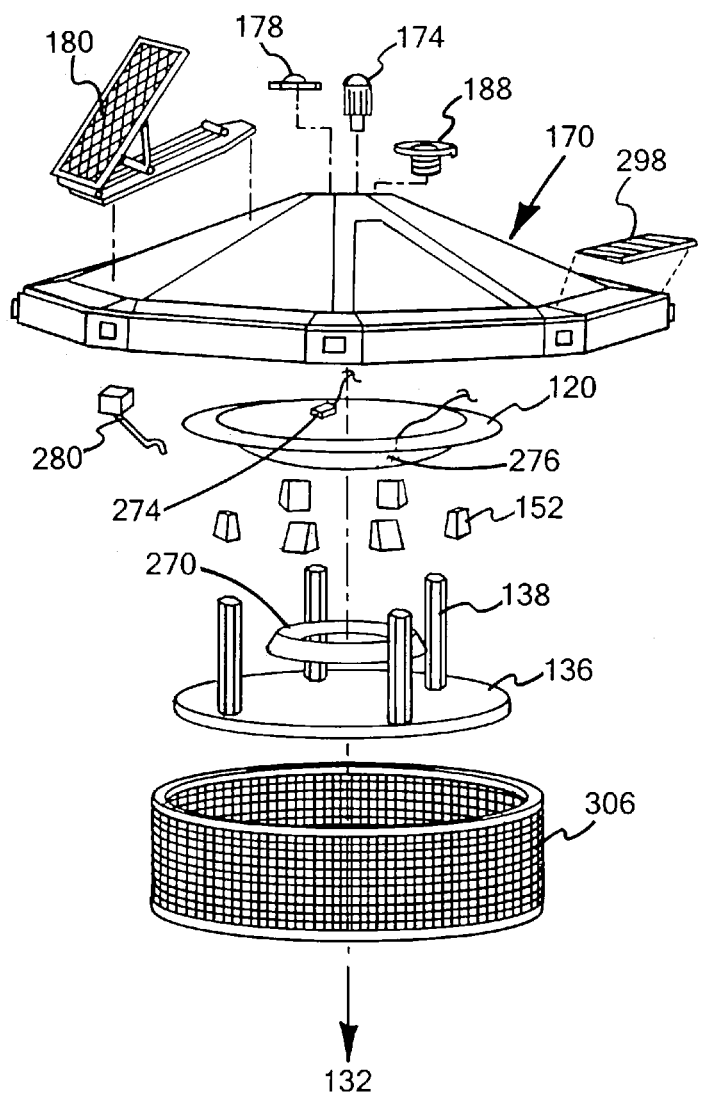
FIG. 13 depicts an exploded view of the arthropod abatement device 100 of this invention with canopy 170.
Figure 14:
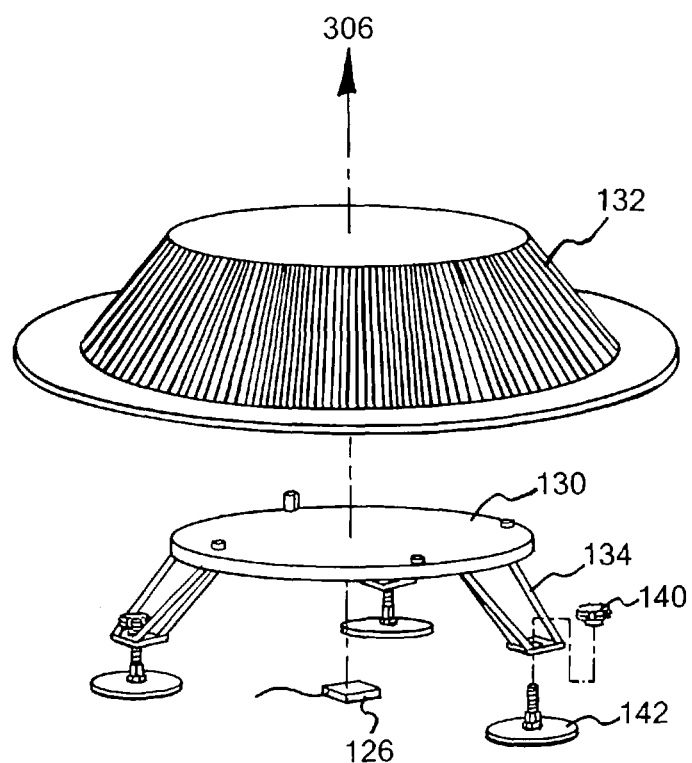
FIG. 14 depicts an exploded view of the arthropod abatement device 100 of this invention with lower base 130.
Figure 15:
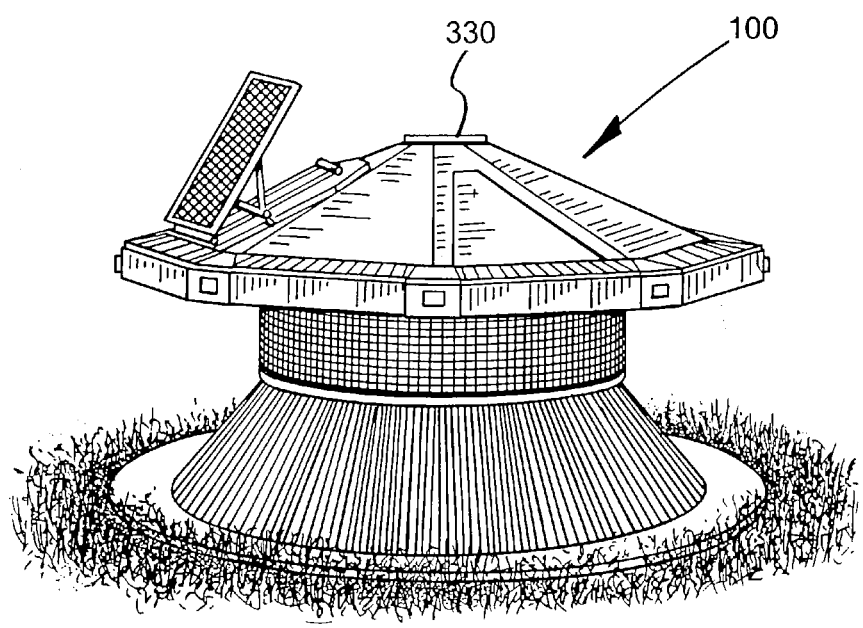
FIG. 15 depicts a side perspective view of the arthropod abatement device 100 of this invention with a display 330.
Figure 16:
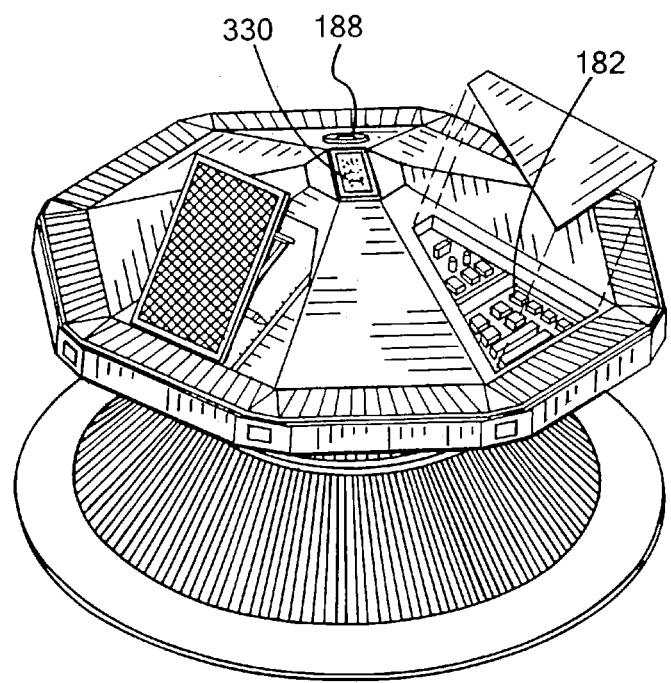
FIG. 16 depicts a top perspective view of the arthropod abatement device 100 of this invention with a display 330.
Figure 17:
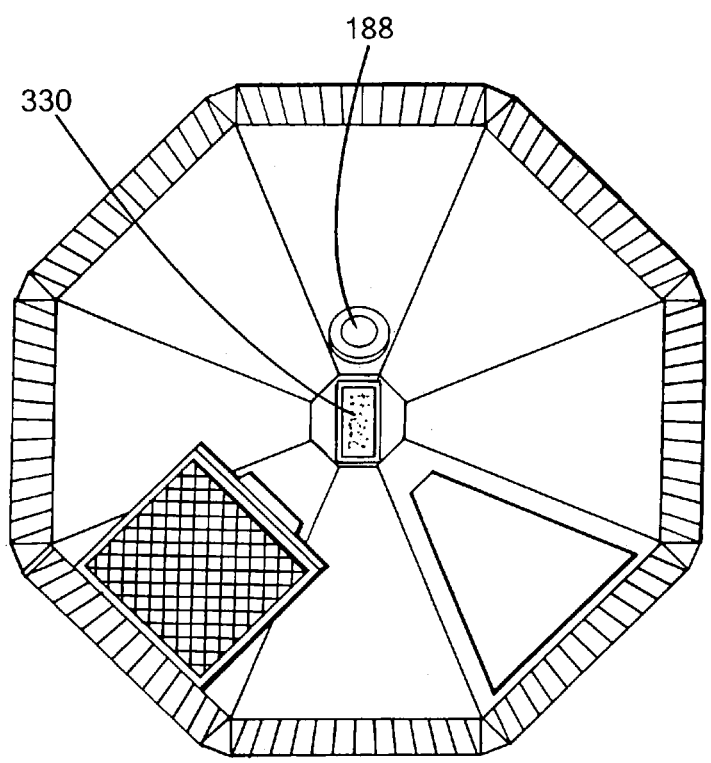
FIG. 17 depicts a top plan view of the arthropod abatement device 100 of this invention with a display 330.
Figure 18:
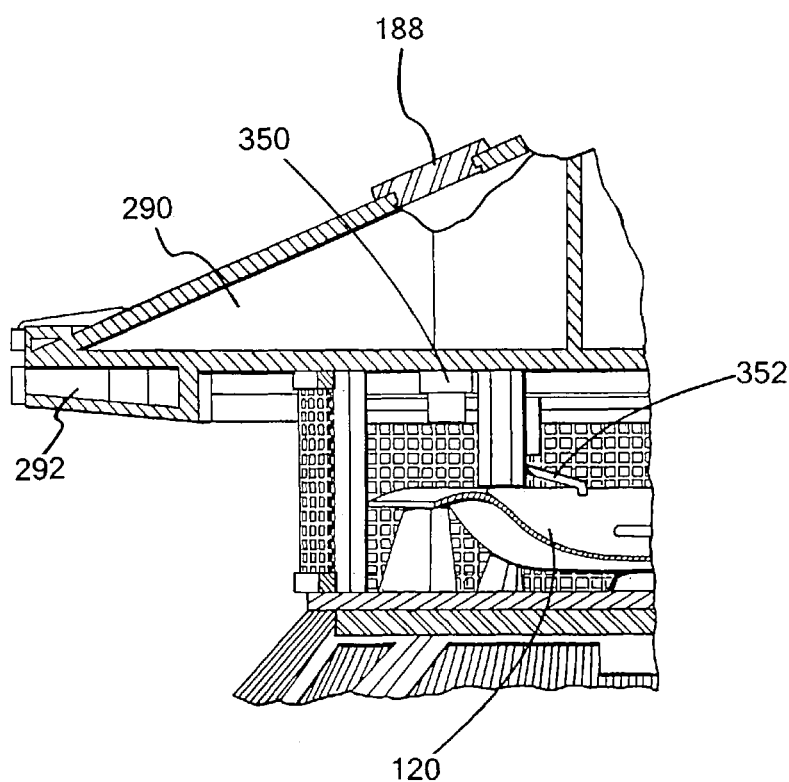
FIG. 18 depicts a side, partially cutaway view of the arthropod abatement device 100 of this invention with a display 330.

Adding FIG. 11, FIG. 13 and FIG. 14 to the consideration, the structure of arthropod abatement device 100, due to the cutaway view thereof. Skirt member 132 has a skirt rim 260 with bristles 262 extending downwardly therefrom. Bristles 262 are angled outwardly and cover legs 134 of lower base 130. Bristles 262 are uniform in both length and position. So if lower base 130 is not level, a bulge or other lack of uniformity in bristles 262, provide an additional indication of how to a reach level state, in addition to other devices. Bristles 262 additionally help direct the arthropods, such as mosquitos, to the water container 120 for eventual extermination. Typical level devices include an electronic leveling device 264 mounted in an appropriate fashion on a bottom of lower platform 128 of lower base 130.

Upper base 136 rests, at its upper platform, on the top of lower platform 128, Upper base 136 receives an optional, but preferred, bowl cradle 270. Bowl cradle 270 receives and supports flat horizontal round bottom water container 120. Around bowl cradle 270 are the support pillars 138 for the canopy 170. At the top of each of support pillars 138 is a bowl retainer 152, to provide additional support for bowl 120.

Within water container 120 are the bowl heater 272 and temperature sensor 274. Bowl heater 272 warms the water in the container 120 to a temperature sufficient to kill the arthropod, especially the mosquito, in the form of eggs, pupae or larvae. Temperature sensor 274 provides communication between the bowl heater 272 and the computer assembly 182 to keep temperature within a proper range.

Also in the container 120 is a drain 276 electrically connected to and controlled by the computer assembly 182. In this manner, water may be drained from container 120 in the event of a malfunction in the arthropod abatement device 100, which results in so that arthropod pupae, eggs or larvae, not being killed, thereby avoiding device 100, functioning as a breeding ground for mosquitoes or other undesirable arthropods. With water level sensor 230, which uses a solenoid or other appropriate device, controlling the desired amount of water to be placed in flat horizontal round bottom water container 120 is feasible, although other control methods are operable. This structure provides for a thin layer of water or a shallow depth of water, which is, in turn, more attractive to the arthropods.

Considering now FIG. 11, FIG. 12, FIG. 13 and FIG. 14, screen assembly 300 fits around container 120. Screen assembly 300 is circular in nature, and has upper screen ridge 302 and a lower screen ridge 304 with a screen member 306 positioned and secured therebetween. Screen assembly 300 rests on upper base 136 at lower screen ridge 304. Preferably, canopy support pillars 138 are inside of screen assembly 300 and provide additional support to screen assembly 300 in particular and mosquito abatement device 100 in general. Upper ridge 302 can also provide additional support for canopy 170.

FIG. 15, FIG. 16, FIG. 17 and FIG. 18 combine to show variations on FIG. 1 and its related figures. Display 330 is mounted in the top of canopy 170, and replaces level indicator 174 (FIG. 10) and light assembly 176 (FIG. 7). Display 330 communicates with computer assembly 182 and the various modules thereof, in order to provide the necessary information based on readouts from the various modules.

With display 330, filler plug 188 (also in FIG. 4) is moved to canopy 170. Filler plug 188 now communicates with a float device 350 and filler tube 352. Filler tube 352 takes water to flat horizontal round bottom water container 120, while float device 350 blocks filler tube 352, when water has reached a desired level in container 120.

Without the level indicator protruding out of the lower base 130, the legs 134 are optional. Also the device 100 may not need the skirt member 132 or the legs 134 if the device were to be set on a level pad or surface such as concrete.

Since the level indicator 174 will not be needed, the light assembly 176 and parts thereof can be completely removed from the device 100, as long as the device 100 is placed in range of a remote location such as a cellular telephone tower, satellite; or other method or type of electronic communication. A text message or some other type of communication from computer assembly 182 can be used to notify a person of a malfunction as a replacement for the light assembly 176 and the extension tower 172.

This new structure also alleviates the need to have person within a visual line of site of the device 100. Also, by eliminating the light assembly 176, the chance of water infiltration and corrosion in the plug 188 is eliminated. The empty space that results by the removal of the compass 178 and the light assembly 176 can be used to place the display 330. The computer assembly 182 also has malfunction specific codes, which can be sent by text to a phone or other device as well as displaying the code on the display 330.

Referring back to FIG. 7, screen assembly 300, that encircles the bowl heater 272 and heating device 312, is preferably hardware cloth or some other type screen. This screen has openings big enough to allow the adult mosquito entrance to lay her eggs and enable her to exit, but small enough to prevent organic material such as leaves, grass and other debris from entering therein.

From the figures, it is clear that the basin or container 120 is preferably formed of a durable plastic. This plastic seems to be the best material because of low or no corrosion, high durability, and ease of attachment to or use with other components such as sensors 230, drains, or floats. However, it will need extra attention to compatibilities of sealants, as plastic can be difficult for certain sealants to adhere thereto.

The desired water level will be lower due to evaporation since the beginning of the cycle. After a number of extensive tests, it seems as though the decaying eggs, larva, and pupae emit a very strong natural attractant, for which the female mosquito will travel a far distance; and will choose the decaying water; which may contain the decaying eggs, larva and pupae; laying the eggs therein. The mosquito may even bypass pond water, river water, or rain water to reach the water of abatement device 100. However, if there are Pheromones or other possible chemicals that fall under field of chemical ecology or other fields of science, it will make the device that more effective. Such attractants can be added to the water or sprayed around mosquito abatement device 100. Adding to the water generally makes the attractant longer lasting.

A computer processing unit (CPU) or computer assembly 182 can be incorporated for the purpose of initiating the extermination killing cycle by starting up bowl heater 272 to heat the water to the point of death to eggs, larva and pupa. Such information may be programmed into the computer assembly 182 and retrieved as desired.

A CPU will by far be the best option for the following reasons to operate this arthropod abatement device 100 for many reasons. One can enter a zip code, an area code or latitude and longitude coordinates. Then a pre-loaded software program will automatically set the settings for the type of mosquitoes in that area of the world. There are more than 2,700 species of mosquitoes worldwide. Texas has the more species than any other state with about 55. Nationally the total of different species for mosquitoes is about 170.

Other settings may also be set in this fashion. From the coordinates, the program will define which species of mosquitoes are in that area, and set the other parameters that will be used, based on the characteristics of the different species. Thus, all species that are targeted will be exterminated after a completed cycle. Such or all settings for arthropod abatement device 100 may also be done manually for the less complex versions arthropod abatement device 100. Some or all of the settings for arthropod abatement device 100 may be done by computer, electronically, manually or combinations thereof.

Parameters, such as when to begin the heating process after the start of the cycle, how hot to heat the water, or what type of attractant to use which is dependent on the species, which are targeted can be preset. Quantity of an attractant to use is also dependent on the species targeted, as well as to what temperature the water must have when the attractant is to be injected. These parameters and others will be dependent on the location of the device in the world.

The complete cycle can take anywhere from a few days to a few weeks depending on the type of species and the daily average temperature of the water, since the growth rate of all larvae is dependent on the average daily water temperature. This cycle applies to mosquito metamorphosis or any other arthropod. The cooler the water the slower the life cycle will be, such as in spring or fall. The warmer the water becomes, the faster the life cycle of the arthropods will be. It follows that this is especially true in the summer months.

With the program of the computer processing unit or assembly 182, it will sense the increase in water temperature of the bowl or container 120 since the sunrise and start the heater 272; when the water temperature has stopped rising and has begun to decrease a set number of degrees, or when temperature in the time frame between sunrise and the first decline of water temperature. By taking this action, it becomes possible to enable the device 100 to heat the water mixture at a high temperature of the day. By taking this action, the device will use less of the stored energy in the battery above described.

It can also sense if the water temperature achieved the temperature needed, If such a temperature is not attained, it will open a drain, such as bowl drain 276, to empty the breeding bowl of all liquid in order for that breeding bowl or water container not to become a breeding ground for the very mosquitoes or arthropods it is trying to abate. The drain will stay open until the unit can be serviced, at which point the malfunction will be fixed, and the drain will then be closed The CPU assembly may also direct the light assembly 176, such as a light-emitting diode or other signal on top of the canopy 170 to blink if service is required, especially in the event of a malfunction. The canopy 170 of the device 100 will incorporate a number of features. One will be a see-through column or light cover 168 located on the very top of the device 100 or canopy 170, where has a number of components incorporating a number of processes, located around the edge of the canopy 170 with a gutter 292 and a drain port where the rain run off is deposited and stored for use when the reproduction or extermination bowl needs to be refilled. The inside bottom of the water chamber or water storage tank 290 has an incline or slope 294 to direct water to the valve 296 that is used to diminish the rainwater chamber when the reproduction or extermination bowl needs to be refilled. A gutter guard and smaller screening 298 is above the opening of the water chamber to filter leaves and other organic material The column for the light assembly 176 extends upwardly, and inside of the column may be:
(1) Three light-emitting diodes (led) connected to the leveling sensor which aid the user in knowing which leg(s) needs to be adjusted
(2) A green led which indicates when the device is level.
(3) Malfunction led lights located on the side.

Another feature on the top surface is the ability to remove the canopy 170 clear plastic dome and replace it with an extension tower 172, to which the light assembly 176 may be attached. The light assembly 176 may include malfunction LED indicators. The malfunction LED indicators will be used after set up in case of other malfunctions.

Another feature on the top surface or canopy 170 is a reservoir plug or filler plug 188 incorporated on the top of the canopy 170 for the device 100 used to fill with water at the spring set up. This reservoir or water storage tank 290 is filled if the environment around the location of the abatement device 100 does not receive much annual rain fall, and may even be needed around a marsh or other wet land.

One is also able to adjust the solar panel 180 height with graduated pitch indicator 192 for the maximum light from the direct rays of the sun the unit will receive in the middle of summer when it is needed the most due to the fact that mosquitoes breed faster in warmer temperatures than cooler temperatures.

For example, in Alaska, the solar panel 180 stands in a more vertical position, which thereby enables panel 180 to point lower in the horizon than in South America. Two slanted panels on the upper section of the device 100 each have a different purpose. One panel is to be an access panel 186 to the different components, such as the batteries for the CPU or computer assembly 182, and other components.

The other panel accepts the adjustable solar panel 180. The solar panel assembly 182 has a graduated pitch indicator 192, which is used as a reference to line up the solar panel 180. The reference numbers can be matched to a chart, which will correspond to the latitude. In the upper latitudes, the solar panel 180 needs to be adjusted on more of vertical plane than the lower latitudes.

Figure 19:
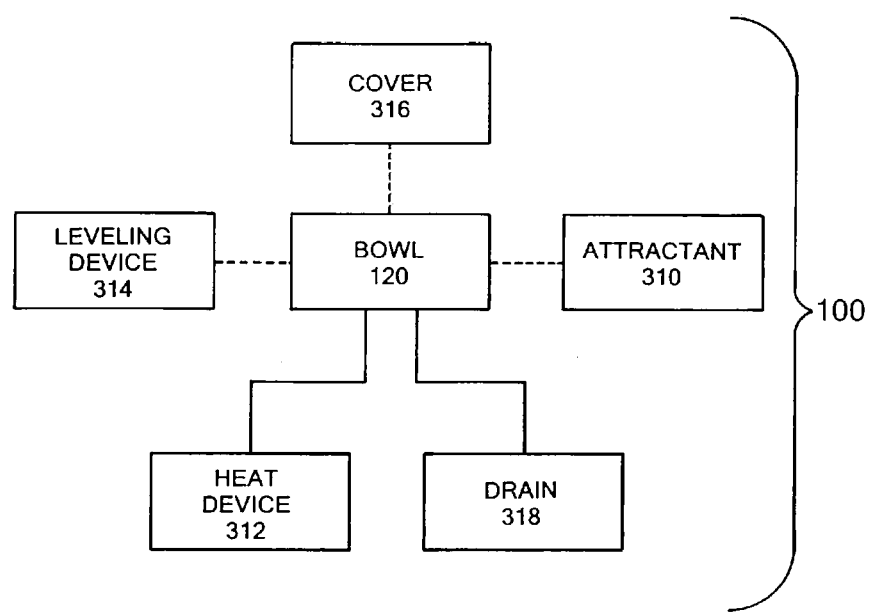
FIG. 19 depicts a block diagram of the arthropod abatement device 100 of this invention.

In FIG. 19, a variety of structures for mosquito abatement device 100 may be considered. Bowl 120 receives water. Mosquitoes are attracted to the water with or without attractant 310. Attractant 310 may be incorporated into the water or used in a separate device adjacent to the abatement device 100 in general and bowl 120 in particular. A heating device 312 warms the water after a period of time to a desired temperature. Heating device 312 may include the bowl heater 272 of FIG. 11 or other suitable heater. Such hot water kills the eggs, pupae or larvae; especially of the mosquito; present in the water. Because water is selectively heated after the mosquitoes have had a chance to lay larvae producing eggs therein, the larvae can then be killed. Modifications are shown in the previous figures.

Furthermore, bowl 120 may also be supported on a leveling device 314 if desired. An appropriate leveling device 314 may include lower base 130 (FIG. 4), accelerometer 332 (FIG. 20), or other suitable leveling device. On top of bowl 120 may be an optional cover 316. Cover 316 can include canopy 170 (FIG. 4) as set forth above together with its supporting structure or some other suitable cover.

An accelerometer, such as accelerometer 332, also measures proper acceleration, which is the acceleration it experiences relative to freefall and is the acceleration felt by people and objects. Put another way, at any point in space or time the equivalence principle guarantees the existence of a local inertial frame, and an accelerometer measures the acceleration relative to that frame. Such accelerations are popularly measured in terms of gravitational force.

Bowl 120 may also include a drain 318, to remove water from the bowl 120 as desired. Drain 318 may be hand operated, mechanically operated, or electrically operated. Thus, drain 318 may be controlled remotely as desired. For example, if heating device 312 malfunctions, drain 318 may be opened to drain the water, thereby preventing the abatement device 100 to serve as a breeding ground.

Figure 20:
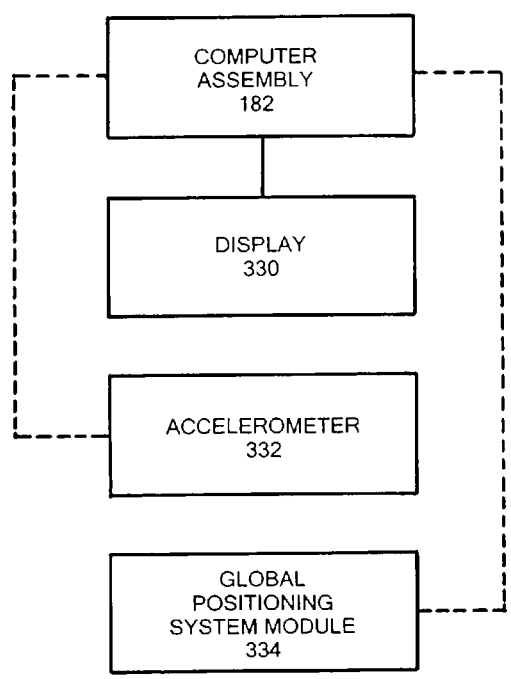
FIG. 20 depicts a block diagram of the computer assembly 182 for arthropod abatement device 100 of this invention.

In FIG. 20, a variety of structures or uses for computer assembly 182 become clear. An accelerometer 332 is an integrated module that can be incorporated into the computer assembly 182. This module for the accelerometer 332 is able to sense level status of the abatement device 100, as well as other features. The display 330, to indicate if the device 100 is level, can be a digital bubble level, which will appear in the display 330 pursuant to instructions from the computer assembly 182. There is an application for cellular telephones for the digital bubble level as free download.

The accelerometer 332 cannot sense compass direction. However by the installation of a global positioning system (GPS) module 334, a number of processes can be accomplished and will make the compass 178 (FIG. 10) unnecessary. Module 334 also renders the level sensor and the need to manually input of the latitude unnecessary. The information from the module 334 can be sent to display 330 by the computer assembly 182.

There is another way that can be used when the device 100 with module 334 is set up that eliminate the need for manual input of the latitude. One may use any blue tooth or other type of transmitter that can communicate with the computer 182. By combining an accelerometer 332 with a GPS module 334, the compass 178 (FIG. 10 on top can be replaced with a water proof liquid crystal (LCD) diode or other type of display 330. Display 330 can display direction, level and a number for the proper angle of the pitch indicator. Also, the computer assembly 182 can gather the data from the GPS module 334 which establish the parameters needed for the species of mosquitoes in the area.

In the following examples, which are intended to illustrate without unduly limiting the scope of this invention, all parts and percentages are by weight unless otherwise indicated.

EXAMPLE 1

On a summer night in a mosquito plagued area of Kingston, Ill., three people of similar body proportions and ancestry, and clothing are outside. Person one has no mosquito protection. Person two has a coating of DEET-containing mosquito on exposed body areas. Person three has a coating of lotion without DEET on exposed body areas. Person one suffers the most mosquito bites of three people during a period of exposure. Person two suffers the least mosquito bites of three people during the same period of exposure.

EXAMPLE 2

The procedure of Example 1 is repeated, on a day when there is very similar weather as in the previous example with the same people, but no one is wearing any mosquito repellant. Only an activated mosquito abatement device 100 is present. Person one is 10 meters from mosquito abatement device 100. Person two is 20 meters from mosquito abatement device 100. Person three is 30 meters from mosquito abatement device 100. No one suffers more than one-third of the mosquito bites, suffered by Person two of Example 1. Specifically, seven days after abatement device 100 is set up, there is a marked decrease in the number of mosquitoes. Seven days later, there are few or no mosquitoes. Still seven days after that, the only evidence of any type of mosquito activity inside the area is the live eggs, larva and pupae in the water of the flat round bottom bowl in the device before the killing cycle has taken placed This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this device can become clear to a person having ordinary skill in this particular art. Such modifications are clearly covered by this disclosure.

What is claimed and sought to be protected by Letters Patent is:

1. An arthropod abatement device, which attracts at least one egg-laying arthropod to lay eggs in a desired area of water and kills the eggs, or the pupae or larvae derived therefrom with subsequently heated water, comprising:
    a) the abatement device including a housing with a water container, a heating device, and a support;
    b) the heating device being adapted to heat a water supply in the water container sufficiently to kill the eggs, or the pupae or larvae derived from the at least one arthropod;
    c) the support for the water container being an upper base for the arthropod abatement device;
    d) the water container providing a thin layer of water in the container in order to attract a laying of the eggs therein;
    e) the water container being a bowl;
    f) the water container having a cover mounted thereabove;
    g) the housing having an upper base and a lower base:
    h) a leveling device cooperating with the lower base to permit the water container to remain level when the abatement device is placed in service;
    i) the water container including a drain to remove water from the water container when desired;
    j) the upper base of the housing being positioned above the lower base;
    k) a skirt member surrounding the lower base;
    l) the upper base of the housing being on the lower base and slidably fitted within skirt member;
    m) at least two canopy pillars around an edge of the upper base of the housing; and
    n) the at least two canopy pillars supporting a canopy around an edge of the upper base of the housing.

2. The arthropod abatement device of claim 1 further comprising:
    a) a solar panel being mounted on the canopy provide a power source for the arthropod abatement device;
    b) the solar panel providing power to a light assembly and a computer assembly;
    c) the computer assembly controlling the abatement device;
    d) the bowl having a flat bottom; and
    e) the light assembly providing a condition report for the abatement device.

3. The arthropod abatement device of claim 2 further comprising:
    a) the computer assembly being connected to the solar panel as a power source;
    b) the computer assembly including a set of computer controls therefor;
    c) the set of computer controls being protected by an access panel;
    d) the light assembly including a malfunction indicator for water flow or heating functions of the arthropod abatement device; and
    e) the solar panel being mounted on a graduated pitch device to adjust its for maximum effectiveness.

4. The arthropod abatement device of claim 3 further comprising:
    a) the canopy having therein a level indicator, a compass, and the light assembly;
    b) the level indicator cooperating with the leveling device to provide placement; of the abatement device so that water container is level; and
    c) the drain being controlled by the computer assembly.

5. The arthropod abatement device of claim 4 further comprising:
   a) the arthropod abatement device including an extension tower;
   b) the extension tower being suitable for use when the arthropod abatement device is placed in tall grass;
   c) the extension tower having the level indicator and the light assembly mounted therein;
   d) the compass permitting the solar panel to be positioned as desired for maximum effectiveness;
   e) a filler plug in the canopy to permit access to the water container.

6. The arthropod abatement device of claim 5 further comprising:
   a) the light assembly including a light housing;
   b) the light housing being electrically connected to the canopy;
   c) the light housing supports the level indicator;
   e) the light housing including a system down light to be activated when the arthropod abatement device malfunctions;
   f) the light housing including at least one location light to permit the arthropod abatement device to be located efficiently;
   g) the extension tower having a telescoping assembly; and
   h) the light housing having a light housing cover mounted thereover.

7. The arthropod abatement device of claim 4 further comprising:
   a) the light assembly including a light housing;
   b) the light housing being electrically connected to the canopy;
   c) the light housing supports the level indicator;
   e) the light housing including a system down light to be activated when the arthropod abatement device malfunctions;
   f) the light housing including at least one location light to permit the arthropod abatement device to be located efficiently; and
   g) the light housing having a light housing cover mounted thereover.

8. The arthropod abatement device of claim 7 further comprising:
   a) the solar panel including a pitch indicator;
   b) the pitch indicator including various lock notches with a lock device to position the solar panel;
   c) the lower base including a lower platform;
   d) the lower platform having three adjustable legs; and
   e) the water container having a flat horizontal round bottom horizontal to a ground surface.

9. The arthropod abatement device of claim 8 further comprising:
   a) each of the adjustable legs having a wide surfaced foot for use on soft ground;
   b) an anchor being secured to each of the adjustable legs to secure the arthropod abatement device in a desired position;
   c) the canopy having the level indicator, the filler plug and the compass situated in the center thereof; and
   d) the canopy including a gutter around the edge thereof to catch rain water.

10. The arthropod abatement device of claim 9 further comprising:
    a) a screen being placed over the gutter;
    b) a water storage tank being mounted in the canopy;
    c) the gutter feeding rain water to the water storage tank;
    d) the water storage tank providing a reservoir for water to be used in the water container;
    e) the water storage tank communicating with the filler plug;
    f) the skirt member having a skirt rim with bristles extending downwardly therefrom;
    g) the bristles being angled outwardly to cover the legs of the lower base; and
    h) the bristles being uniform in both length and position.

11. The arthropod abatement device of claim 10 further comprising:
    a) the upper base of the housing receiving a bowl cradle;
    b) the bowl cradle supporting the water container;
    c) at least two support pillars for the canopy surrounding the bowl cradle;
    d) a bowl retainer at the top of each of the at least two support pillars of the canopy;
    e) the heating device and a temperature sensor cooperating with the water container;
    f) the temperature sensor providing communication between the heating device and the computer assembly to keep temperature of water in the water container within a proper range;
    g) the drain being electrically connected to and controlled by the computer assembly;
    h) the water level sensor controlling an amount of water to be placed in the flat horizontal round bottom water container;
    i) a screen assembly fitting around the water container;
    j) the at least two canopy support pillars fitting inside of the screen assembly;
    k) the water container being formed of a durable plastic; and
    l) the water container including an attractant for the arthropods.

12. The arthropod abatement device of claim 11 further comprising:
    a) the attractant selected from a decayed version of the eggs, larva, and pupae of the arthropods; and Pheromones;
    b) the light assembly including a red light emitting diode to indicate if the arthropod abatement device is malfunctioning;
    c) the water storage tank being sloped to direct water as desired;
    d) the light assembly including a green light emitting diode connected to a leveling sensor which aids the user in knowing which legs are properly adjusted;
    e) the compass permitting the solar panel to have a southern exposure, 13. The arthropod abatement device of claim 12 further comprising:
    a) the computer assembly including at least one module selected from the group consisting of an accelerometer and a global positioning system module;
    b) a display being centrally mounted on the cover; and
    c) the computer assembly feeding data from the accelerometer or the global positioning system module to the display, or a receiver at a remote location.

14. An arthropod abatement device, which attracts at least one egg-laying arthropod to lay eggs in a desired area of water and kills the eggs, or the pupae or larvae derived therefrom with subsequently heated water, comprising:
    the abatement device including a housing with a water container, a heating device, and a support;

the heating device being adapted to heat a water supply in the water container sufficiently to kill the eggs, or the pupae or larvae derived the at least one arthropod;

the housing having an upper base and a lower base;

the support for the water container being an upper base for the arthropod abatement device;

the water container having a flat bottom to provide a thin layer of water in the container;

the water container being a bowl;

the water container having a cover mounted thereabove;

a leveling device cooperating with the lower base to permit the water container to remain level when the abatement device is placed in service;

the cover being releasably secured to the lower base of the housing;

the water container including a drain to remove water from the water container when desired;

the upper base of the housing being positioned above the lower base;

a skirt member surrounding the lower base;

the upper base of the housing being on the lower base and slidably fitted within skirt member;

at least two canopy pillars around an edge of the upper base of the housing;

the at least two canopy pillars supporting a canopy around an edge of the upper base of the housing;

a solar panel being mounted on the canopy provide a power source for the arthropod abatement device;

the solar panel providing power to a light assembly and a computer assembly;

the computer assembly controlling the abatement device;

the light assembly providing a condition report for the abatement device;

the computer assembly being connected to the solar panel as a power source;

the computer assembly including a set of computer controls therefor;

the set of computer controls being protected by an access panel;

the light assembly including a malfunction indicator for water flow or heating functions of the arthropod abatement device;

the solar panel being mounted on a graduated pitch device to adjust its for maximum effectiveness;

the canopy having therein a level indicator, a compass, and the light assembly;

the level indicator cooperating with the leveling device to provide placement of the abatement device so that water container is level;

the drain being controlled by the computer assembly;

light assembly including a light housing;

the light housing being electrically connected to the canopy;

the light housing supports the level indicator;

the light housing including a system down light to be activated when the arthropod abatement device malfunctions;

the light housing including at least one location light to permit the arthropod abatement device to be located efficiently; and the light housing having a light housing cover mounted thereover.

* * * * *